US008086245B2

(12) United States Patent
Karaoguz et al.

(10) Patent No.: US 8,086,245 B2
(45) Date of Patent: Dec. 27, 2011

(54) ADVERTISING AND CONTROLLING THE ADVERTISEMENT OF WIRELESS HOT SPOTS

(75) Inventors: Jeyhan Karaoguz, Irvine, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1012 days.

(21) Appl. No.: 10/315,187

(22) Filed: Dec. 10, 2002

(65) Prior Publication Data

US 2004/0203890 A1    Oct. 14, 2004

Related U.S. Application Data

(60) Provisional application No. 60/409,934, filed on Sep. 12, 2002.

(51) Int. Cl.
*H04W 24/00* (2009.01)
(52) U.S. Cl. ..................... 455/456.1; 455/457
(58) Field of Classification Search ............... 455/456.1, 455/510, 517, 404.1, 41.2, 457; 370/389
See application file for complete search history.

(56) References Cited

U.S. PATENT DOCUMENTS

| | | | |
|---|---|---|---|
| 5,404,392 A * | 4/1995 | Miller et al. | 455/466 |
| 5,682,142 A * | 10/1997 | Loosmore et al. | 340/572.1 |
| 6,289,224 B1 * | 9/2001 | Boxall et al. | 455/517 |
| 6,351,647 B1 | 2/2002 | Gustafsson | 455/466 |
| 7,017,174 B1 * | 3/2006 | Sheedy | 725/87 |
| 7,054,627 B1 * | 5/2006 | Hillman | 455/422.1 |
| 2002/0006788 A1 * | 1/2002 | Knutsson et al. | 455/422 |
| 2002/0059453 A1 * | 5/2002 | Eriksson et al. | 709/238 |
| 2002/0077118 A1 * | 6/2002 | Zellner et al. | 455/456 |
| 2002/0173311 A1 * | 11/2002 | Biggs et al. | 455/450 |
| 2002/0176579 A1 * | 11/2002 | Deshpande et al. | 380/270 |
| 2002/0191575 A1 * | 12/2002 | Kalavade et al. | 370/338 |
| 2003/0003933 A1 * | 1/2003 | Deshpande et al. | 455/510 |
| 2003/0097425 A1 * | 5/2003 | Chen | 709/220 |
| 2003/0118015 A1 * | 6/2003 | Gunnarsson et al. | 370/389 |
| 2003/0176579 A1 * | 9/2003 | Mishra et al. | 525/240 |
| 2003/0177504 A1 * | 9/2003 | Paulo et al. | 725/118 |
| 2003/0228842 A1 * | 12/2003 | Heinonen et al. | 455/41.2 |
| 2004/0015403 A1 * | 1/2004 | Moskowitz et al. | 705/26 |

(Continued)

FOREIGN PATENT DOCUMENTS

EP    1022876 A1    7/2000

(Continued)

OTHER PUBLICATIONS

"IEEE 802.11, A Technical Overview," Pablo Brenner, BreezeNet website, Jul. 8, 1997, www.sss-mag.com/pdf/802l1p.pdf.

(Continued)

*Primary Examiner* — Marisol Figueroa
(74) *Attorney, Agent, or Firm* — McAndrews, Held & Malloy, Ltd.

(57) ABSTRACT

A process of determining locations of and services offered by wireless hotspots is disclosed. Locations of and services offered by wireless hotspots, for wireless portable devices to wirelessly connect to a larger network, are requested from a selected one of a wireless telephone service provider and a nearby hotspot and a response is awaited from the selected one. Information regarding locations of and services offered by wireless hotspots is received from the selected one and data is provided to a user related to the received information.

40 Claims, 7 Drawing Sheets

U.S. PATENT DOCUMENTS

| | | | | |
|---|---|---|---|---|
| 2004/0058717 A1* | 3/2004 | McDonnell et al. | ......... | 455/567 |
| 2004/0203630 A1* | 10/2004 | Wang | ......... | 455/414.1 |
| 2004/0203847 A1* | 10/2004 | Knauerhase et al. | ...... | 455/456.1 |
| 2004/0203873 A1* | 10/2004 | Gray | ......... | 455/456.1 |
| 2005/0117602 A1* | 6/2005 | Carrigan et al. | ............ | 370/466 |

FOREIGN PATENT DOCUMENTS

| | | |
|---|---|---|
| EP | 1079644 A1 | 2/2001 |
| EP | 1119211 A2 | 7/2001 |
| WO | WO 0189155 A1 | 11/2001 |
| WO | WO 0217117 A2 | 2/2002 |

OTHER PUBLICATIONS

Donny Jackson, Telephony, Ultrawideband May Thwart 802.11, Bluetooth Efforts, PRIMEDIA Business Magazines & Media Inc., Feb. 11, 2002.

Daniel L. Lough, et al., "A Short Tutorial on Wireless LANs and IEEE 802.11," The IEEE Computer Society's Student Newsletter, Virginia Polytechnic Institute and State University, Summer 1997, vol. 5, No. 2.

Dr. Robert J. Fontana, "A Brief History of UWB Communications," Multispectral.com, Multispectral Solutions, Inc., www.multispectral.com/history.html, Aug. 20, 2002.

Gerald F. Ross, "Early Motivations and History of Ultra Wideband Technology," Anro Engineering, Inc., Multispectral.com, Multisprectral Solutions, Inc., www.multispectal.com/history.html, Aug. 20, 2002.

Dr. Terence W. Barrett, "History of UltraWideband (UWB) Radar & Communications: Pioneers and Innovators," Proceedings and Progress in Electromagnetics Symposium 2000 (PIERS2000), Cambridge, MA, Jul. 2000.

Dr. Henning F. Hannuth, "An Early History of Nonsinusoidal Electromagnetic Technologies," Multispectral.com, Multispectral Solutions, Inc., www.multispectral.com/history.html, Aug. 20, 2002.

Rebecca Taylor, "Hello, 802.11b and Bluetooth: Let's Not Be Stupid!", ImpartTech.com, www.ImportTech.com/802.11-bluetooth.htm, Aug. 21, 2002.

Matthew Peretz, "802.11, Bluetooth Will Co-Exist: Study," 802.11-Planet.com, INT Media Group, Inc., Oct. 30, 2001.

"Bluetooth and 802.11: A Tale of Two Technologies," 10Meters.com, www.10meters.com/blue_802.html, Dec. 2, 2000.

Keith Shaw, "Bluetooth and Wi-Fi: Friends or foes?", Network World Mobile Newsletter, Network World, Inc., Jun. 18, 2001.

Joel Conover, "Anatomy of IEEE 802.11b Wireless," NetworkComputing.com, Aug. 7, 2000.

Bob Brewin, "Intel, IBM Push for Public Wireless LAN," Computerworld.com, Computerworld Inc., Jul. 22, 2002.

Ernest Khoo, "A CNET tutorial: What is GPRS?", CNETAsia, CNET Networks, Inc., Feb. 7, 2002.

Les Freed, "Et Tu, Bluetooth?", ExtremeTech.com, Ziff Davis Media Inc., Jun. 25, 2001.

Bluetooth & 802.11b—Part 1, www.wilcoxonwireless.com/whitepapers/bluetoothvs802.doc , Jan. 2002.

Bob Brewin, "Report: IBM, Intel, Cell Companies Eye National Wi-Fi Net," Computerworld.com, Computerworld Inc., Jul. 16, 2002.

Bob Brewin, "Microsoft Plans Foray Into Home WLAN Device Market," Computerworld.com, Computerworld Inc., Jul. 22, 2002.

Bob Brewin, "Vendors Field New Wireless LAN Security Products," Computerworld.com, Computerworld Inc., Jul. 22, 2002.

Jeff Tyson, "How Wireless Networking Works," Howstuffworks.com, Howstuffwork, Inc., www.howstuffworks.com/wireless-network.htm/printable, Aug. 15, 2002.

Curt Franklin, "How Bluetooth Works," Howstuffworks.com, Howstuffworks, Inc., www.howstuffworks.com/bluetooth.htm/printable, Aug. 15, 2002.

802.11b Networking News, News for Aug. 19, 2002 through Aug. 11, 2002, 80211b.weblogger.com/, Aug. 11-19,2002.

"Wireless Ethernet Networking with 802.11b, An Overview," HomeNetHelp.com, Anomaly, Inc., www.homenethelp.com/80211.b/index.asp, Aug. 20, 2002.

"Simple 802.11b Wireless Ethernet Network with an Access Point," HomeNetHelp.com, Anomaly, Inc., www.homenethelp.com/web/diagram/access-point.asp, Aug. 20, 2002.

"Simple 802.11b Wireless Ethernet Network without an Access Point," HomeNetHelp.com, Anomaly, Inc., www.homenethelp.com/web/diagram/ad-hoc.asp, Aug. 20, 2002.

"Cable/DSL Router with Wired and Wireless Ethernet Built In," HomeNetHelp.com, Anomaly, Inc., www.homenethelp.com/web/diagram/share-router-wireless.asp, Aug. 20, 2002.

"Bridging a Wireless 802.11b Network with a Wired Ethernet Network" HomeNetHelp.com, Anomaly, Inc., www.homenethelp.com/web/diagram/wireless-bridged.asp, Aug. 20, 2002.

"Wireless Access Point (802.11b) of the Router Variety," HomeNetHelp.com, Anomaly, Inc., www.homenethelp.com/web/diagram/share-wireless-ap.asp, Aug. 20, 2002.

Robert Poe, "Super-Max-Extra-Ultra-Wideband!", Business2.com, Oct. 10, 2000.

David G. Leeper, "Wireless Data Blaster," ScientificAmerican.com, Scientific American, Inc., May 4, 2002.

Steven J. Vaughan-Nichols, "Ultrawideband Wants to Rule Wireless Networking," TechUpdate.ZDNet.com, Oct. 30, 2001.

Jim Zyren and Al Petrick, "Brief Tutorial on IEEE 802.11 Wireless LANs," AN9829, Intersil Corporation, Feb. 1999.

"Overview of UWB?", Pulse-LINK.net, Pulse~LINK, Inc., www.pulselink.net/ov_history.html, Sep. 4, 2002.

Robert X. Cringely, "The 100 Mile-Per-Gallon Carburetor—How Ultra Wide Band May (or May Not) Change the World," InterestingPeople.org, Jan. 26, 2002.

William A. Kissick, Editor, "The Temporal and Spectral Characteristics of Ultrawideband Signals," NTIA Report 01-383, Jan. 2001, www.its.bldrdoc.gov/pub/ntia-rpt/01-383/.

"Ultra Wide Band," www.ida.gov.sg/Website/IDAContent.nsf/dd1521fle79ecf3bc825682f0045a349/1856626048baf40 3c8256988026 7e26%3FOpenDocument+%22Full+duplex+UWB+handheldtransceiver%22&hl=en&ie=UTF-8, Aug. 20, 2002.

* cited by examiner

ADVERTISING AND CONTROLLING THE ADVERTISEMENT OF WIRELESS HOT SPOTS

REFERENCE TO RELATED APPLICATIONS

This application claims priority of U.S. Provisional Patent Application Ser. No. 60/409,934, filed on Sep. 12, 2002. The subject matter of this earlier filed application is hereby incorporated by reference.

BACKGROUND OF THE INVENTION

1. Field of Invention

The present invention relates to devices and networks that utilize wireless networks and methods of promoting wireless networks. The present invention further relates to methods, devices and networks that allow for users to be informed about wireless services available from a wireless hotspot or a location with wireless access. Additionally, the present invention also provides for a process and a filter that can filter advertisements received and alert a user when certain criteria are meet.

2. Description of Related Art

The emergence of what are commonly called wireless hotspots has increased the mobility of wireless users and allowed mobile users to access network resources without requiring a physical connection to a main network. Many of these wireless hotspots have sprung up in many establishments, such as coffee shops and libraries, and allow users with wireless communication equipment to communicate with local area networks and wide area networks as they move about. The locations that provide the access do so to attract customers or, in the case of libraries, because they see such access as an extension of their public interest. However, potential users of the hotspots do not know the locations of the hotspots or know what the attributes of those hotspots are. While users may be able to access certain websites to determine the locations of hotspots, these websites are often not updated and do not provide the information that many users need when they are on the road and want to access a hotspot.

In addition, such information provided about hotspot locations should be aimed at the mobile users and should be specific to the types of services available through a specific hotspot. A user of a wireless portable device may be in a new area and would likely appreciate the location of the nearest hotspot that would let the user download data from the Internet or how to get to a hotspot that provides voice-over-IP connections to users. Presently, users must "sniff" out locations by operating their wireless portable devices in a "promiscuous" mode and hope that detected hotspots will allow them to access those hotspot locations.

As such, there is a need for a method or mechanism that can advertise the presence of hotspot locations and the services offered by those hotspot locations, along with data related to the usage by the hotspot locations. In addition, there is also a need for systems and methods that can determine the services offered by a hotspot without having to login to the hotspot and ways of filtering advertisements received to prevent the user from being inundated with unwanted data.

SUMMARY OF THE INVENTION

It is an object of this invention to overcome the drawbacks of the above-described conventional network devices and methods. The present invention is directed to advertising the presence of hotspot locations and the services offered by those hotspot locations. In addition, the present invention is directed to systems and methods that can determine the services offered by a hotspot without having to login to the hotspot and ways of filtering advertisements received to prevent the user from being inundated with unwanted data.

According to one aspect of this invention, a process of determining locations of and services offered by wireless hotspots is disclosed. Locations of and services offered by wireless hotspots, for wireless portable devices to wirelessly connect to a larger network, are requested from a selected one of a wireless telephone service provider and a nearby hotspot and a response is awaited from the selected one. Information regarding locations of and services offered by wireless hotspots is received from the selected one and data is provided to a user related to the received information.

Alternatively, the selected one may be the nearby hotspot and the information received would pertain to services offered by the nearby hotspot. Also, the selected one may be the wireless telephone service provider and the information received would pertain to wireless hotspots closest to the user based on a determination made by wireless telephone service provider. The determination may be based on a cell of a cellular network of the cellular telephone service provider, in which the user's wireless portable device resides or based on global positioning information sent along with the request for locations of and services offered by wireless hotspots in the requesting step, where the information may be at least one of directions to the wireless hotspots closest to the user and a map detailing routes to the wireless hotspots closest to the user. The process may include the step of receiving data related to services of proximate hotspots including at least one of a number of users of the proximate hotspots, an expected bandwidth available to a new user at the proximate hotspots and bandwidth levels accessible through the proximate hotspots.

According to another embodiment of the invention, a process of advertising locations of and services offered by a wireless hotspot to potential users is disclosed. An advertising message, detailing a location of and services offered by a wireless hotspot, is sent out from a selected one of a wireless telephone service provider and the wireless hotspot and a response is awaited for from the advertising message from a wireless portable device. Thereafter, the response is received and detailed information related to access of the wireless hotspot is provided to the wireless portable device.

Additionally, the selected one may be the wireless telephone service provider and information sent would be about the location of and services offered by the wireless hotspot. That information may include detailed information about the services offered by the wireless hotspot that is tailored to a type of wireless portable device from which the response was received in the receiving step. The process may also include authenticating the wireless portable device for access to the wireless hotspot, monitoring the use of the wireless hotspot by the wireless portable device, and sending out informational advertising messages detailing further services to the wireless portable device.

Additionally, informational advertising messages may be sent to the wireless portable device indicating a higher bandwidth mode is available or may be served to the wireless portable device in exchange for access to the wireless hotspot. In addition, the process may include the steps of monitoring traffic on a channel used to send out the advertising message and waiting until the channel is clear before sending out a next advertising message.

In another embodiment, a process of determining services offered by a wireless hotspot is disclosed. An access point of a wireless hotspot is queried by a wireless portable device about at least one of goods and services offered by the wireless hotspot and a reply to the query is awaited from the access point of the wireless hotspot. Then, a listing of the at least one of goods and services offered by the wireless hotspot is provided to a user of the wireless portable device. The process may also include awaiting a request for further information about capabilities of the wireless hotspot, processing the request for further information, sending the processed request for further information to the access point, awaiting a response to the processed request for further information from the access point and providing at least a portion of the response to the user of the wireless portable device. When the wireless hotspot is a vendor of goods, the listing may include at least one of the goods offered by the vendor, prices of the goods and descriptions of the goods. When the wireless hotspot is a provider of wireless network services, the listing may include at least one of the wireless network services provided by the provider, access costs for access to the wireless network services, bandwidths available for access to the wireless network services and descriptions of the wireless network services.

In an additional embodiment, an advertising filtering system for filtering advertising of locations of and services offered by wireless hotspots is disclosed. The filter includes receiving means for receiving an advertising message, detailing locations of and services offered by wireless hotspots, by a wireless portable device, comparing means for comparing the advertising message with criteria established by an advertising filter and providing means for providing an indication to a user of the wireless portable device of positive receipt of a particular advertising message meeting the criteria when the criteria are met for particular advertising message. The providing means may include activating means for activating at least one of an audible indicator and a visual indicator to alert the user of the particular advertising message. Also, the filtering system may have displaying means for displaying at least a portion of the particular advertising message to the user of the wireless portable device.

In another embodiment, an advertising system for advertising locations of and services offered by wireless hotspots is disclosed. The system includes a requester for requesting locations of and services offered by wireless hotspots, for wireless portable devices to wirelessly connect to a larger network, from a selected one of a wireless telephone service provider and a nearby hotspot, a timer for awaiting a response from the selected one, a receiver for receiving information regarding locations of and services offered by wireless hotspots from the selected one and a provider for providing data to a user related to the received information.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

The present invention includes methods and systems that advertise the existence and attributes of hotspots and provide ways to locate those hotspots. The present invention also allows for targeted advertising of hotspots such persons seeking certain capabilities from a hotspot can be specifically informed about the existence of the hotspot and/or the available capabilities. The advertising of hotspots and their attributes has the added benefit of allowing users to select a hotspot based on their specific needs and evaluate the utility of a hotspot for themselves without having to log on to the hotspot.

It is understood that many small proprietors of establishments which include wireless hotspots may not have the ability to advertise their hotspots because this requires extra time and effort making sure that the advertising is accurate and also having to maintain and control the access to the hotspot. One solution to this problem is to have another entity supply the hotspot services and advertise them to increase use of those services.

One candidate for offering these services is telephone and wireless telephone providers, where those providers already provide cellular and other wireless telephone data services to their users. Following a similar model as that used for mobile telephones, access to wireless hotspots can be coordinated through wireless telephone service providers, with the wireless telephone service providers assisting in authenticating of users, monitoring of usage, and billing of users.

Another candidate for offering wireless hotspot services could be a third party company that supplies services to the wireless hotspot locations, provides authentication of users and processes and forwards billing information to billing party. Thus, the third party company could provide the interface between the hotspots and a corporation with which the user of the hotspot has an account. The corporation could be a telephone company or a wireless telephone company or some other service provider.

Figure 1:
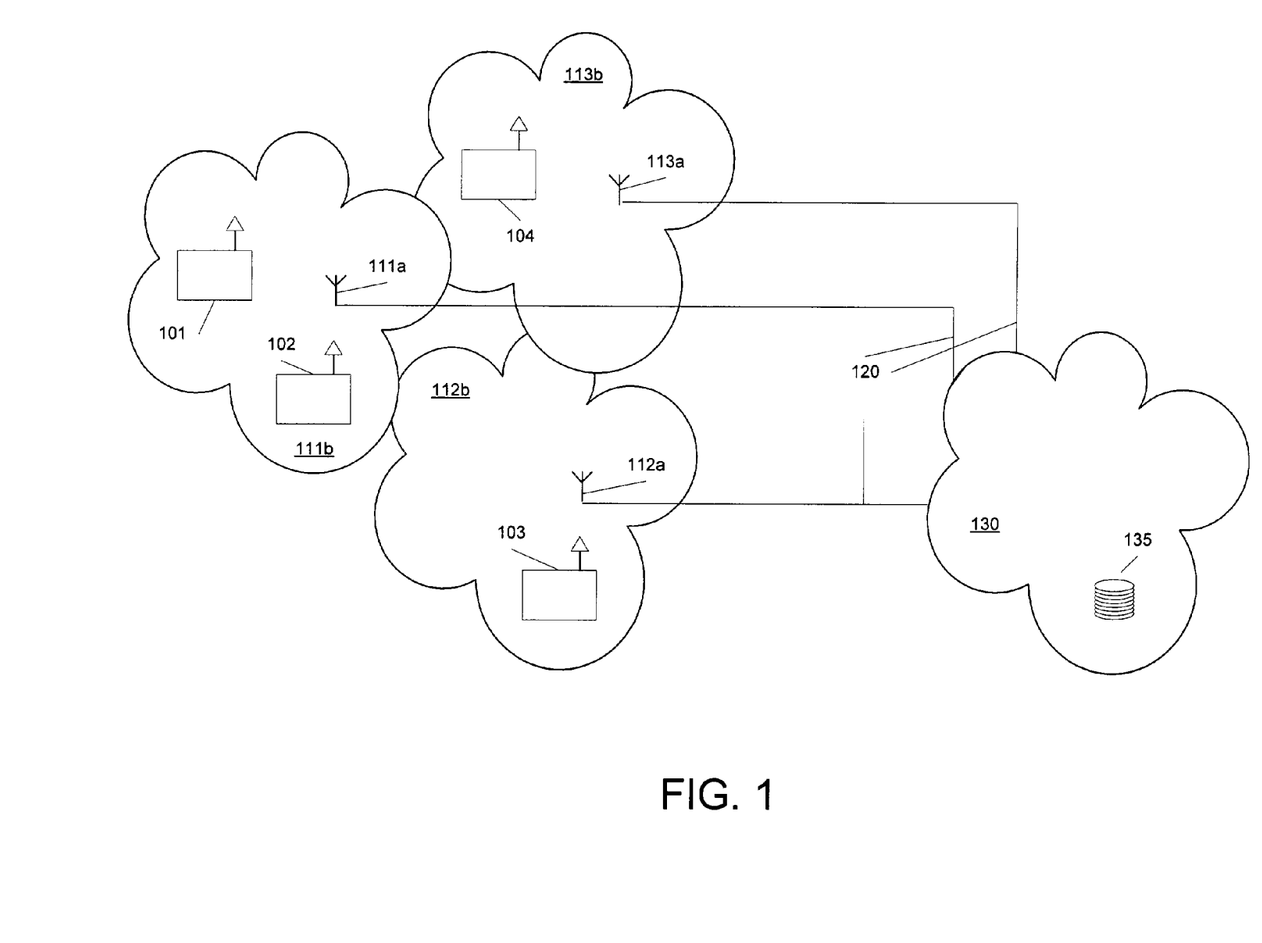
FIG. 1 is a schematic representation of a wireless telephone system having multiple cells, according to one embodiment of the present invention.

A general cellular telephone network is illustrated in FIG. 1. Multiple cells 111*b*, 112*b* and 113*b* are established through the use of antennas 111*a*, 112*a* and 113*a*. Devices 101-104 having access to the cellular telephone network are able to move from cell to cell and maintain access with the network. Each antenna 111*a*-113*a* has a connection 120 with a service provider 130. The service provider 130 controls access to the network and coordinates the handing-off of access as the devices pass between the cells. The service provider identifies each device and routes communication to the proper location of the particular device. Commonly, the devices 101-104 may be cellular telephones, computers with wireless modems, or other devices that exchange information with the service provider.

Figure 2:
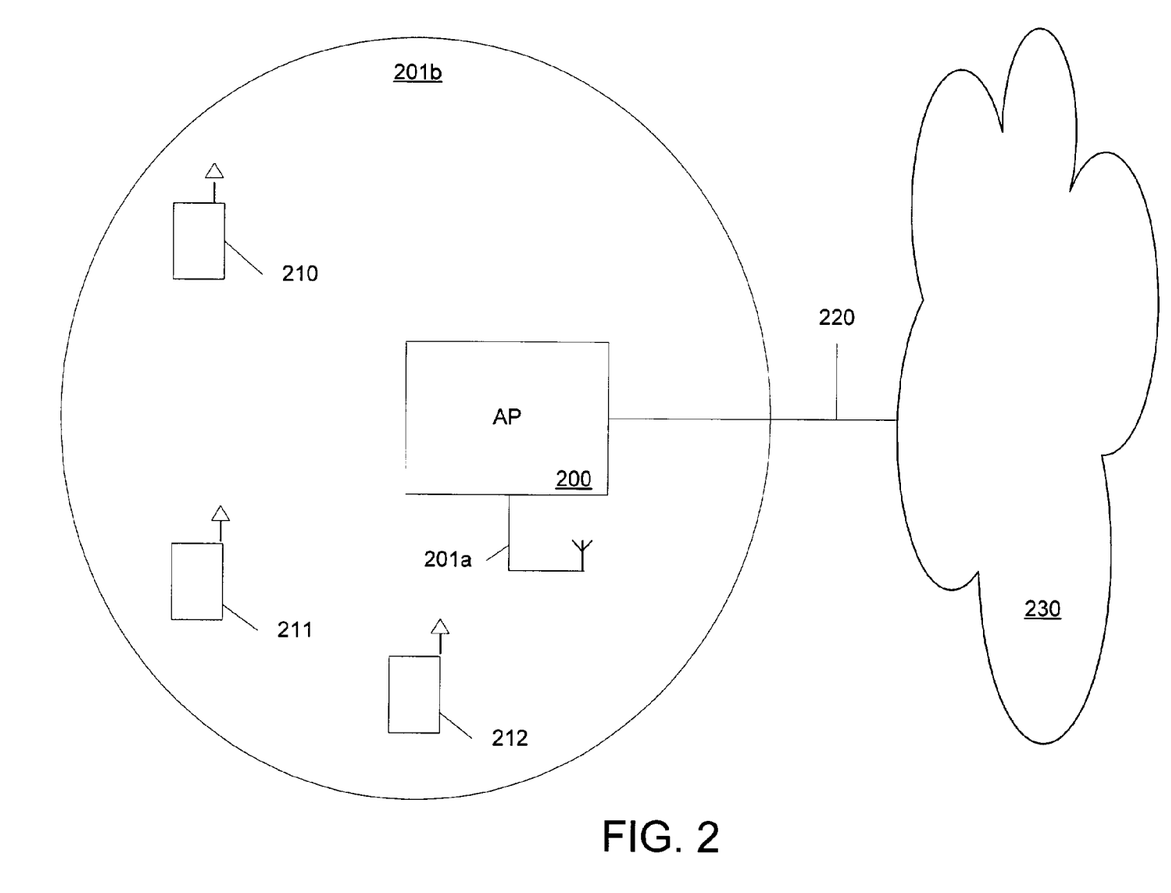
FIG. 2 illustrates a schematic representation of a wireless hotspot with an access point and several wireless devices, according to one embodiment of the present invention.

A general wireless hotspot installation is illustrated in FIG. 2. The hotspot may be controlled through an access point 200, with the access point having an antenna 201a to establish a wireless access zone 201b. The wireless access may be made through an IEEE 802.11 standard local area network (LAN) or other type of wireless network. Devices 210-212 within the hotspot are able to communicate with the larger network 230 through communication with the access point 200. The access point 200 is in communication, through the link 220, with the larger network 230 and the access point acts to mediate communication between the devices 210-212 and the larger network and between the devices themselves. As examples, the devices 210-212 may be computers equipped with 802.11 access cards, personal digital assistants enabled for wireless access, or cellular telephones having multiple means for wireless access. The larger network may be the Internet or some private wide area network.

Figure 3:
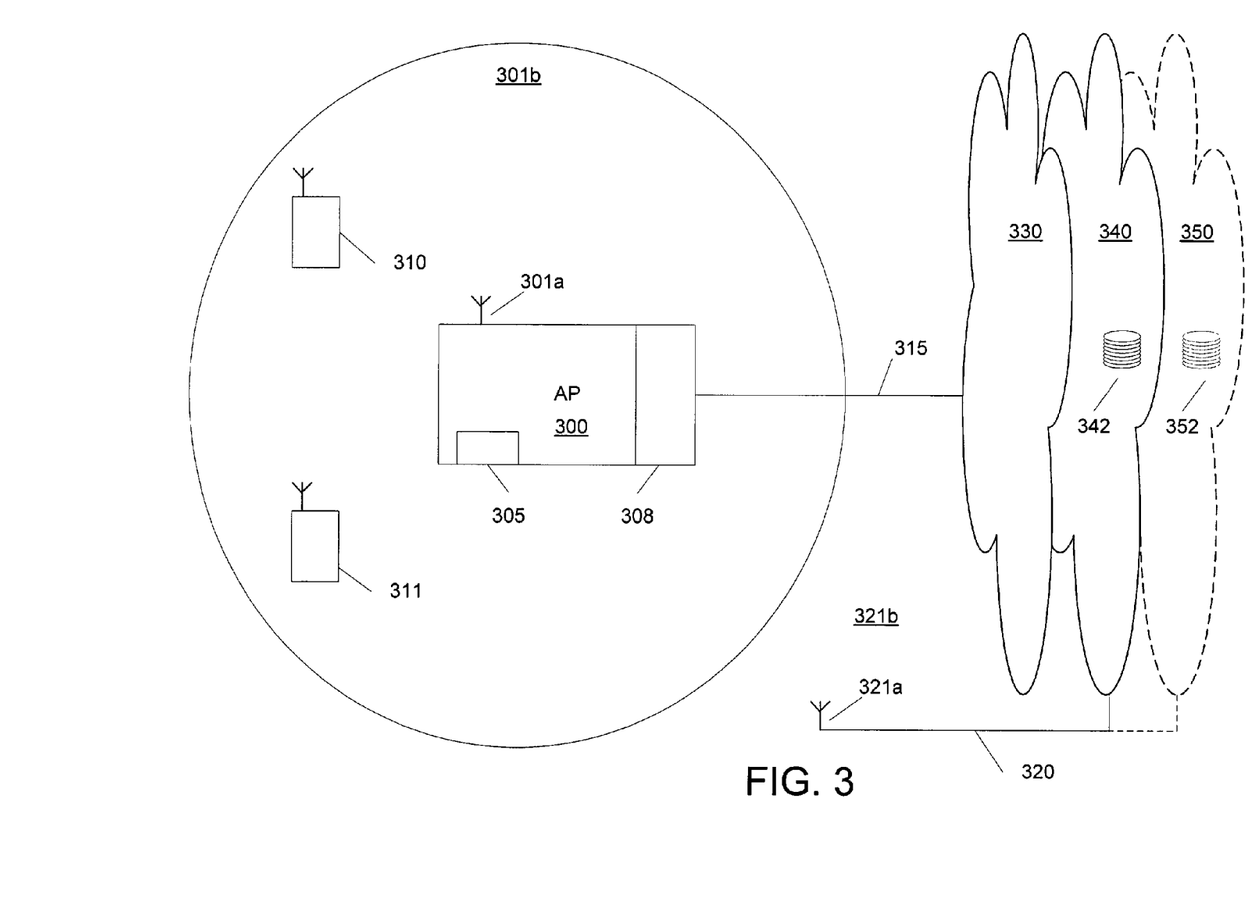
FIG. 3 illustrates a schematic of a wireless hotspot with connections to different network entities, according to an embodiment of the present invention.

FIG. 3 illustrates one embodiment of the present invention. A wireless hotspot is illustrated, with the coverage of the hotspot set by the access point 300 through an antenna 301a, the range of the hotspot is illustrated by the range 301b. Devices 310 and 311 within the range 301b may potentially establish a connection with the hotspot. The access to the access point is controlled through the access controller 305, that may be hardware, firmware, software or a combination thereof. A communication connection 315 is established between the access point 300 and the larger network 330 where that connection is modulated by a router 308.

Also illustrated in FIG. 3 is a wireless telephone service provider 340. The service provider 340 contains a database 342 of users of the wireless telephone network. The wireless telephone service provider can provide services through an antenna 321a, through a connection 320, to provide a coverage area 321b. The coverage area 321b for the wireless telephone service may also include some or all of the wireless hotspot range 301b.

In another embodiment of the present invention, a third party could act as an agent for the service provider and would create the incentive for establishing the hotspot locations. In this embodiment, the service provider, such as a wireless telephone provider 350, could have account information for the user in its database 352. The third party 340 could act as a go-between and would maintain its own records of users in a database 342. The benefit of the third party in this embodiment of the present invention is that the third party could provide the interface between the wireless hotspot and the service provider and might not require any direct interaction between the service provider and the wireless hotspot. Another benefit of the third party embodiment is that users could supply account data for accounts they have with entities other than the wireless telephone service provider, such as a television cable company or an Internet service provider.

Figure 4:
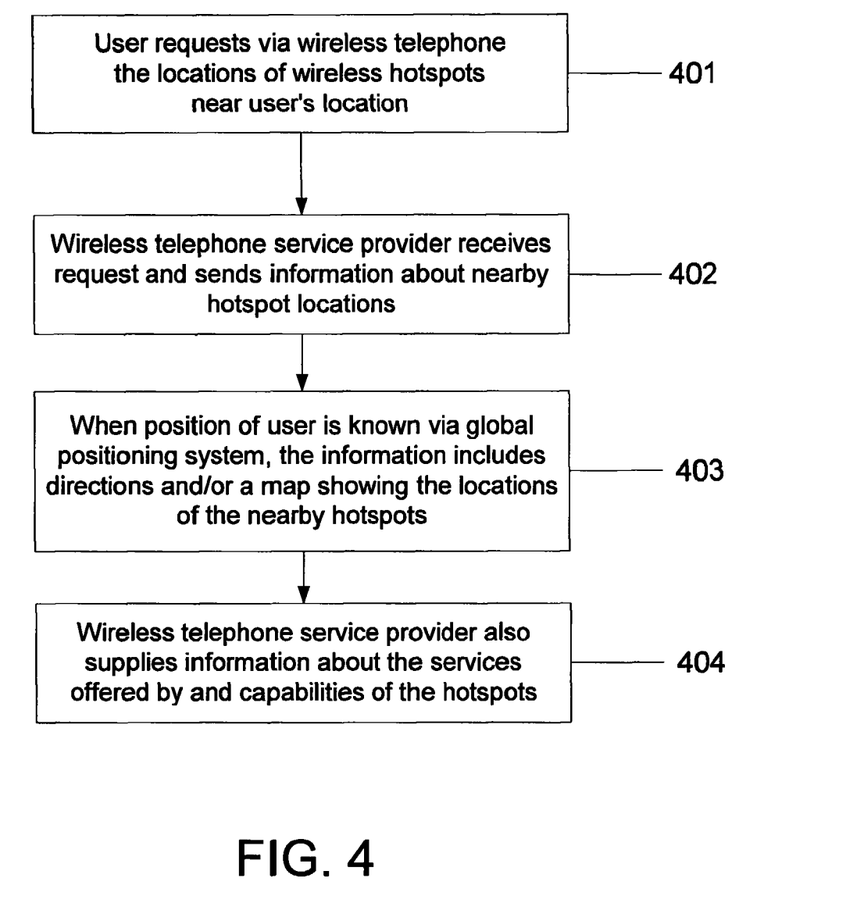
FIG. 4 illustrates a flowchart of the process of providing advertising of hotspots, according to one embodiment of the present invention.

Advertising and controlling the advertisement of a hotspot, according to one embodiment of the present invention, is illustrated in FIG. 4. A user seeking access to a local hotspot proffers a request through the user's wireless telephone to return the locations of wireless hotspots near to the user's location, in step 401. Because the access to the wireless telephone network is segmented into cells, the wireless telephone network knows the approximate location of the user. The wireless telephone network returns locations of nearby wireless hotspots to the user, in step 402. Additionally, if the position of the user is known more precisely through the use of a global positioning system, then information can be provided giving directions and/or a map to the location of a hotspot, in step 403. Additionally, range information may also be included in the information about nearby hotspot locations, such that data about all hotspots within a certain range is sent and the results may be filtered by capabilities, as discussed below.

The wireless telephone service provider also can provide information about the services offered by and capabilities of the nearby hotspots, in step 404, so that the user may make a choice of hotspots on a basis of more than distance. These capacities may include voice, data and video networking capabilities, as well the amount of bandwidth available to users of the hotspots. The data transmitted can also be related to the history and patterns of usage, as well as an expected bandwidth capacity for a new user. Therefore, a user can make an educated determination as to the optimum hotspot for the user. The wireless telephone can also be programmed to filter the results based on hotspot attributes most valued by the user.

Figure 5:
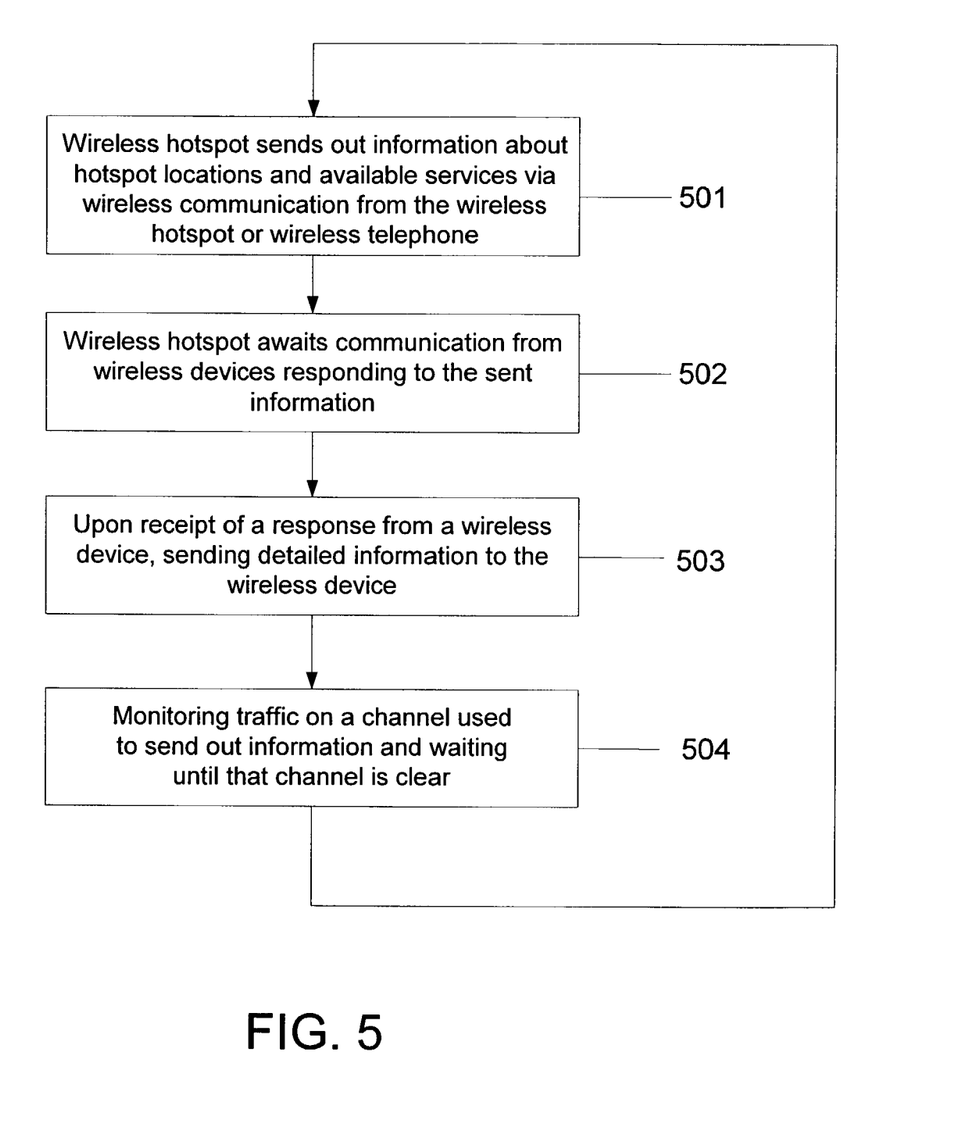
FIG. 5 illustrates a flowchart of the process of advertising the presence and service of a hotspot to potential users, according to another embodiment of the present invention.

In another embodiment, illustrated in FIG. 5, the hotspot or other entity can advertise its services in a more active manner. A wireless hotspot can send out information about hotspot locations and services through a channel or channels monitored by the wireless devices, in step 501. Additionally, another entity, such as a wireless telephone service provider, can advertise the presence and services of hotspots. In the later case, a user may receive an advertisement via their cellular telephone alerting them to a hotspot that has the requirements that the user has specified. Also, the advertisements sent by either the hotspot or the wireless telephone service provider may also be user-based, i.e. sent out to users of a certain location, occupation or special interest, or may also be based on the type of portable device that receives an advertisement. In other words, a sports fan with the ability to receive streaming data might receive an advertisement detailing the presence of a streamed sporting event at a local hotspot.

In FIG. 5, the hotspot awaits communication from a wireless device in response to the information sent, in step 502. Once a response is received, more detailed information can be sent to the wireless device responding, in step 503. The detailed information can be direction information or information provided in response to a specific query included with the response. The hotspot can continue to monitor the information channel or channels and can wait until they are clear before sending out another information message, as provided in step 504. This embodiment allows for a hotspot to advertise specific attributes that may distinguish it from other hotspots and still provide specific information to a potential user.

Figure 6:
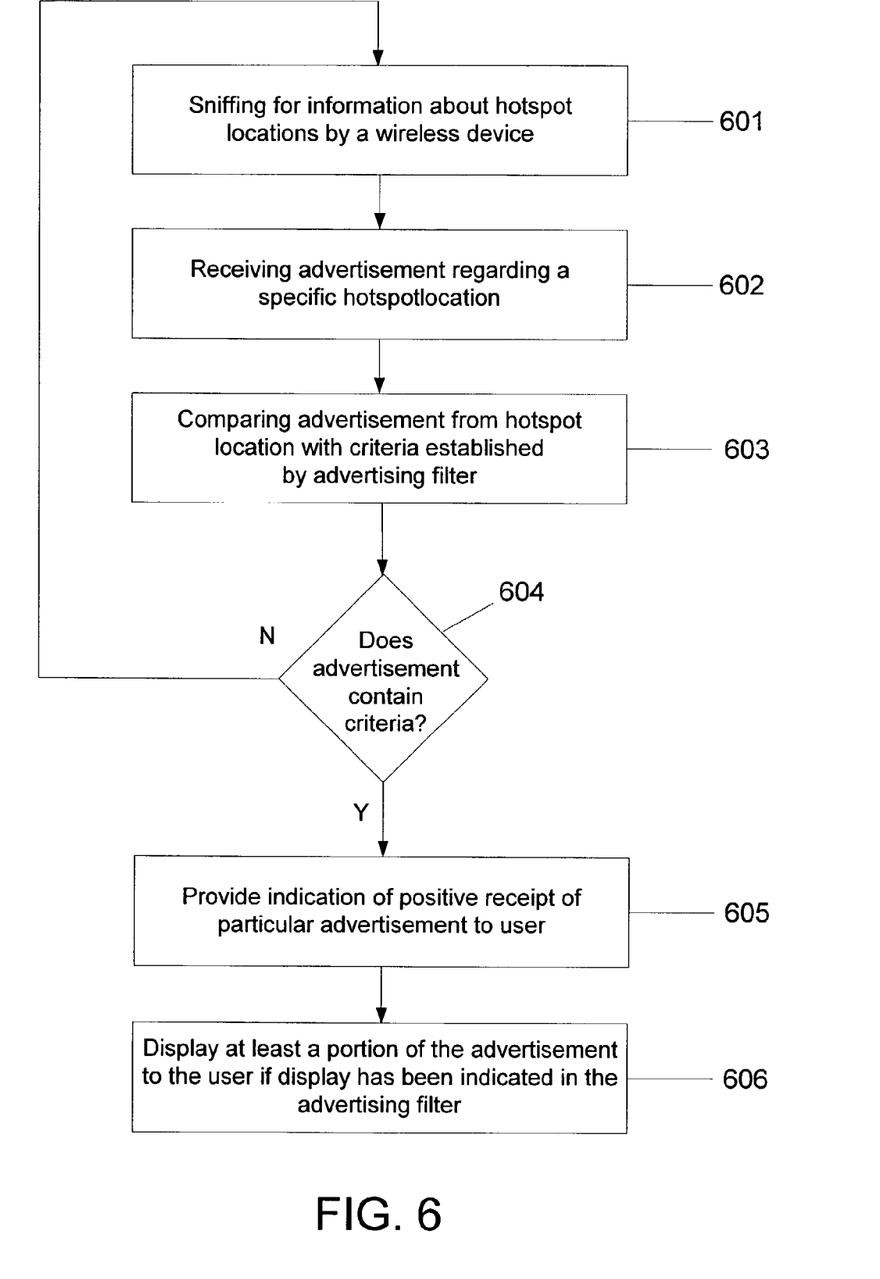
FIG. 6 illustrates a flowchart of the process of filtering advertisements, according to another embodiment of the present invention.

Another embodiment of the present invention that can be used in the advertisement of the wireless hotspots is an advertisement filter. In conjunction with the prior embodiment, when a user has several hotspots advertising their services to the user at once, it may be difficult for the user to sort out the attributes that the user considers to be important. The process, as illustrated in FIG. 6, begins by having the wireless device look for or sniff for information about hotspot locations and attributes, in step 601. The advertisements are received from hotspot locations in response to a query or are unsolicited, in step 602. The received advertisement is compared with criteria established by the advertising filter, in step 603. When the advertisement does not match one of the set criteria, the sniffing process is performed anew. When the advertisement matches one of the criteria, in step 604, the user is provided with an indication that a matching advertisement has been received, in step 605. The indication can be through an audible indicator, a visual indicator or some other indicator to gain the attention of the user. Based on how the filter is set up, at least a portion of the advertisement can be displayed to the user, in step 606. As an example, if a user is seeking a hotspot that has the capacity to print out color prints of a document, then the filter will only alert the user when an advertisement for a hotspot having that capability is received.

In additional embodiments, the type of wireless device and the attributes of the wireless device may be addressed in the advertising. These attributes may include the rate at which the wireless device can send and/or receive data, other modes of wireless communication, integrated and peripheral devices, such as cameras and voice over IP headsets, and intrinsic attributes of the wireless device, such as amount of memory, processor speed and display characteristics. As an example, if the wireless device is a laptop computer with and IEEE 802.11b wireless access card, attributes of the laptop could be determined by the advertising source. After those attributes are determined, the advertising could include text and/or a JPEG file that the laptop is capable of displaying. Alternatively, if the wireless device is a cellular telephone, then the advertisements could be in text-only format. In each case, the abilities and attributes of the wireless devices are taken into account. Additionally, the content of the advertisements can also be tailored to the attributes of the wireless devices. For example, if the laptop is used for voice over IP applications, advertisements detailing the ability of a wireless hotspot to provide the bandwidth and connectivity for voice over IP would be most appropriately sent to such a laptop computer.

Figure 7:
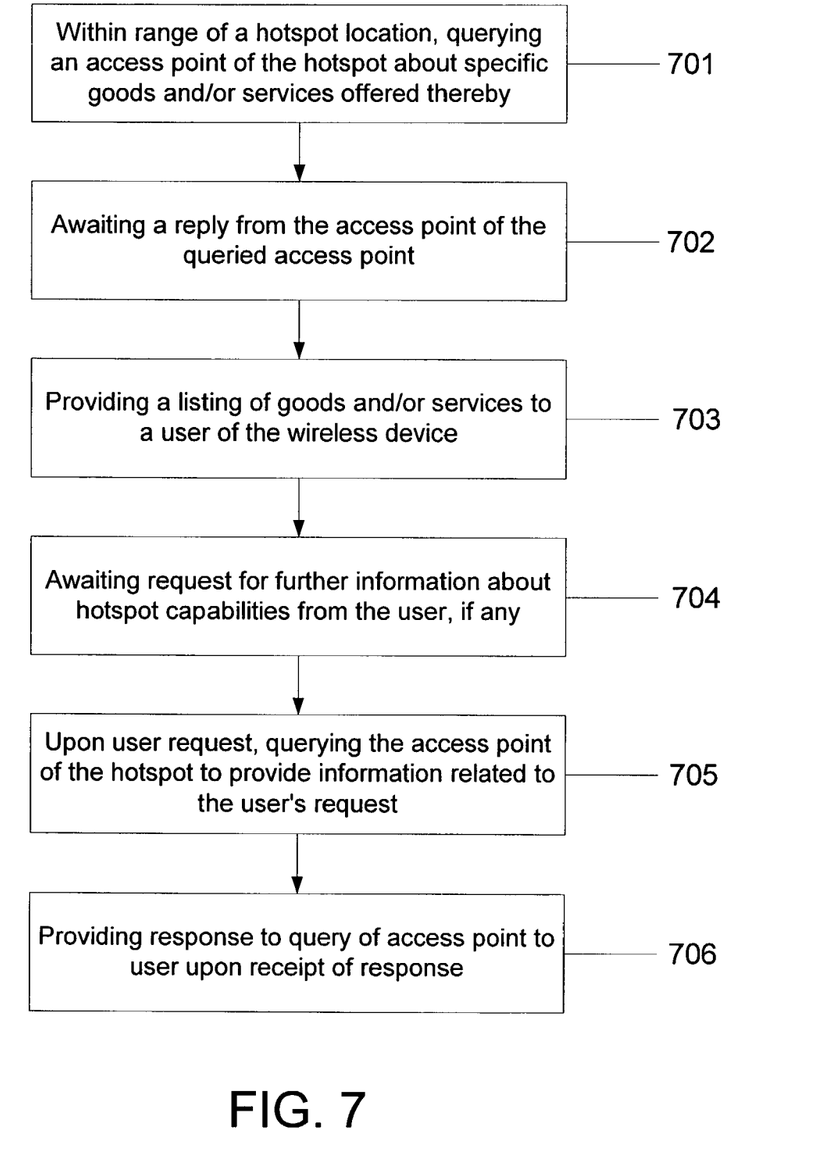
FIG. 7 illustrates a flowchart of the process of querying a hotspot location about goods or services offered by the hotspot location, according to one embodiment of this invention.

Another embodiment of the present invention is directed to allowing a user to determine a range of goods and/or services offered by a hotspot location, illustrated, for example, in FIG. 7. Such advertising could allow a user to query the hotspot to determine whether it provides a needed service without having to log on to the hotspot. When a wireless device is within the range of a hotspot location, the wireless device queries an access point controlling the hotspot about specific goods and/or services provided at the hotspot location, in step 701. The wireless device can await a reply, in step 702 and provides a listing of goods and/or services of the hotspot to the user of the wireless device, in step 703. The user can then request further or more specific information, in step 704 and the hotspot will be queried based on the user's request, in step 705. The hotspot can provide a response that will allow the user to make a decision about the hotspot without requiring authentication by the hotspot.

In addition, while the advertising embodiments discussed above are generally directed to providing users with information before they access hotspot services, the present invention is not so limited. The use of advertising can also continue once the user has been authorized and is accessing hotspot services. Advertisements can be sent to the user's portable device alerting the user about new services. Such advertisements can also alert the user of greater bandwidth modes not be utilized, where the advertisements would be sent because of the existing use of bandwidth by the user's portable device. Also, the access to the services may be advertisement based, i.e. a user may be served advertisement in exchange for access to service's of the hotspot.

It is noted that the present application is directed, at least in part, to wireless hotspots. The use of the term wireless hotspot or hotspot is applicable to any wireless access point. The term wireless hotspot or hotspot, as used in the specification and claims, should not be construed to be limited to a single type of locale or be construed as providing access according to only a particular wireless access format, such as the IEEE 802.11 standard. It would also be within the scope of the invention to implement the disclosed elements of the invention in discrete electronic components, thereby taking advantage of the functional aspects of the invention. Additionally, the present invention can be implemented totally or partially through software.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A process of determining locations of and services offered by wireless hotspots, said process comprising:
   requesting information regarding locations of and services offered by wireless hotspots, for wireless portable devices to wirelessly connect to an Internet, from a third party that acts as a go-between for a wireless telephone service provider that supports a wireless cellular telephone network and a nearby hotspot, the third party supplying hotspot services and advertising the hotspot services, the third party maintaining user account information in a first database, the wireless telephone service provider maintaining user account information in a second database;
   awaiting a response from the third party via the wireless cellular telephone network;
   receiving the information regarding locations of and services offered by wireless hotspots from the third party;
   providing data on a wireless portable device;
   supplying user account data for an account with an entity other than the wireless telephone service provider;
   authenticating, by the third party, the user that supplies the user account data for the account with the entity other than the wireless telephone service provider; and
   accessing the hotspot services supplied by the third party.

2. A process as recited in claim 1, wherein the third party acts as an agent for the wireless service provider, wherein the third party provides an interface between the nearby wireless hotspot and the wireless service provider so that the nearby wireless hotspot and the wireless service provider do not directly interact.

3. A process as recited in claim 1, wherein the third party comprises a Information Service Provider (ISP) with which the user has an account and wherein said step of receiving information comprises receiving information about wireless hotspots closest to the user from the ISP based on a determination made by the wireless telephone service provider.

4. A process as recited in claim 1, wherein the wireless telephone service provider comprises a cellular telephone service provider and wherein said step of receiving information comprises determining the wireless hotspots closest to the user based on a cell, of a cellular network of the cellular telephone service provider, in which the user's wireless portable device resides.

5. A process as recited in claim 1, wherein said step of receiving information comprises receiving information about wireless hotspots closest to the user based on global positioning information sent along with the request for locations of and services offered by wireless hotspots in said requesting step.

6. A process as recited in claim 5, wherein said step of receiving information comprises receiving at least one of directions to the wireless hotspots closest to the user and a map detailing routes to the wireless hotspots closest to the user.

7. A process as recited in claim 1, wherein said step of receiving information comprises receiving data related to services of proximate hotspots including at least one of a number of users of the proximate hotspots, an expected bandwidth available to a new user at the proximate hotspots, bandwidth levels accessible through the proximate hotspots and services determined to be of specific use for a wireless portable device.

8. A process of advertising locations of and services offered by a wireless hotspot to potential users, said process comprising:
   requesting, by a wireless portable device, information about a wireless hotspot with particular attributes, the particular attributes being manually selected at the wireless portable device;
   sending out an advertising message, detailing a location of and services offered by the wireless hotspot, from a third party that acts as a go-between for a wireless telephone service provider and the wireless hotspot, the third party supplying hotspot services and advertising the hotspot services, the wireless hotspot being selected based on wireless hotspot attributes of the wireless hotspot in view of the selected attributes and the location of the wireless hotspot with respect to a location of the wireless portable device as determined by a global positioning system;
   awaiting a response to the advertising message from the wireless portable device;
   receiving the response;
   providing detailed information related to access of the wireless hotspot to the wireless portable device before the wireless portable device accesses any services of the wireless hotspot;
   supplying user account data for an account with an entity other than the wireless telephone service provider; and
   authenticating, by the third party, the user that supplies the user account data for the account with the entity other than the wireless telephone service provider; and
   accessing the hotspot services supplied by the third party.

9. A process as recited in claim 8, wherein the third party acts as an agent for the wireless service provider, wherein the third party provides an interface between the wireless hotspot and the wireless service provider so that the wireless hotspot and the wireless service provider do not directly interact.

10. A process as recited in claim 8, wherein the third party comprises a Information Service Provider (ISP) with which the user has an account and wherein said step of sending information comprises sending information about the location of and services offered by the wireless hotspot from the ISP.

11. A process as recited in claim 10, wherein said step of providing detailed information comprises providing detailed information about the services offered by the wireless hotspot that is tailored to a type of wireless portable device or attributes of the wireless portable device from which the response was received in said receiving step.

12. A process of advertising locations of and services offered by a wireless hotspot to potential users, said process comprising:
   sending out, by a particular wireless hotspot without soliciting by a wireless portable device, an advertising message through one or more channels monitored by the wireless portable device, wherein the advertising message includes locations of and services offered by a plurality of wireless hotspots including the particular wireless hotspot and special attributes of the particular wireless hotspot that distinguish the particular wireless hotspot from the other wireless hotspots of the plurality of wireless hotspots;
   awaiting, by the particular wireless hotspot, a response to the advertising message from the wireless portable device;
   receiving, by the particular wireless hotspot, the response from the wireless portable device;
   providing, by the particular wireless hotspot, detailed information related to access of the plurality of wireless hotspots to the wireless portable device before the wireless portable device accesses any services from the wireless hotspot and before authentication;
   authenticating, via a third party service provider with which the user has an account and that acts as an agent between the wireless telephone service provider and the particular wireless hotspot, wherein the third party service provider provides an interface such that the wireless telephone service provider and the particular wireless hotspot do not directly interact;
   monitoring the use of the particular wireless hotspot by the wireless portable device; and
   sending out informational advertising messages detailing further services to the wireless portable device based on the monitored use of the particular wireless hotspot by the wireless portable device.

13. A process as recited in claim 12, wherein said step of sending out informational advertising messages comprises sending a message to the wireless portable device indicating a higher bandwidth mode is available.

14. A process as recited in claim 12, wherein said step of sending out informational advertising messages comprises serving advertisements to the wireless portable device in exchange for access to the wireless hotspot.

15. A process as recited in claim 8, further comprising:
   monitoring traffic on a channel used to send out the advertising message; and
   waiting until the channel is clear before sending out a next advertising message.

16. A process of determining services offered by a wireless hotspot, the process comprising:
   receiving, by a wireless portable device, a map and directions to a location of a wireless hotspot based on a location of the wireless portable device that is determined by a global positioning system;
   querying an access point of the wireless hotspot by the wireless portable device about goods offered at the wireless hotspot location without having to log on to the wireless hotspot;
   awaiting a reply to the query from the access point of the wireless hotspot;
   providing a listing of the goods offered at the wireless hotspot location, wherein the listing comprises providing a listing of the goods offered by a vendor at the wireless hotspot location, prices of the goods and descriptions of the goods; and
   logging on to the wireless hotspot via a third party service provider with which the user has an account, wherein the third party service provider acts as an agent between a wireless telephone service provider and the wireless hotspot, wherein the third party provider provides an interface such that the wireless telephone service provider and the wireless hotspot do not directly interact.

17. A process as recited in claim 16, further comprising:
   awaiting a request for further information about capabilities of the wireless hotspot;
   processing the request for further information;
   sending the processed request for further information to the access point;

awaiting a response to the processed request for further information from the access point; and providing at least a portion of the response to the user of the wireless portable device.

18. A process as recited in claim 16, wherein the wireless hotspot further comprises a provider of wireless network services and wherein said step of providing a listing further comprises providing a listing of the wireless network services provided by the provider, access costs for access to the wireless network services, bandwidths available for access to the wireless network services, descriptions of the wireless network services and services determined to be of specific use for a wireless portable device.

19. An advertising system for advertising locations of and services offered by wireless hotspots, comprising:
a mobile cellular phone that requests, via a wireless cellular phone network, locations of and services offered by wireless hotspots connected to an Internet, from a third party that acts as a go-between for a wireless telephone service provider of the mobile cellular phone and the wireless hotspots, the third party supplying hotspot services and advertising the hotspot services, the third party providing authentication of users and processing and forwarding of billing information to wireless telephone service provider,
wherein the mobile cellular phone provides data to a user related to the received information about the wireless hotspots if the wireless hotspots meet criteria set by the user in the mobile cellular phone,
wherein the user supplies user account data for an account with an entity other than the wireless telephone service provider,
wherein the third party authenticates the user that supplies the user account data for the account with the entity other than the wireless telephone service provider, and
wherein the mobile cellular phone accesses the hotspot services supplied by the third party.

20. An advertising system as recited in claim 19, wherein the third party acts as an agent for the wireless telephone service provider, wherein the third party provides an interface between the wireless hotspots and the wireless telephone service provider so that the wireless hotspots and the wireless telephone service provider do not directly interact.

21. An advertising system as recited in claim 19, wherein the third party comprises a Information Service Provider (ISP) with which the user has an account and wherein said receiving means receives information about wireless hotspots closest to the user from the ISP based on a determination made by the wireless telephone service provider.

22. An advertising system as recited in claim 19, wherein receiving means receives information about wireless hotspots closest to the user based on global positioning information sent along with the request for locations of and services offered by said requesting means.

23. An advertising system as recited in claim 22, wherein said receiving means receives at least one of directions to the wireless hotspots closest to the user and a map detailing routes to the wireless hotspots closest to the user.

24. An advertising system for advertising locations of and services offered by a wireless hotspot to potential users, comprising:
a first wireless cellular network that is supported by a wireless telephone service provider, the first cellular network being used to transmit an advertising message detailing a location of and services offered by a wireless hotspot in a second wireless network, the wireless hotspot providing access to an Internet, from a third party that acts as a go-between for the wireless telephone service provider and the wireless hotspot, the third party supplying hotspot services,
wherein the first wireless cellular network receives a response to the advertising message from a wireless portable device,
wherein the first wireless cellular network provides detailed information related to access of the wireless hotspot to the wireless portable device before the wireless portable device accesses any services of the wireless hotspot,
wherein the user supplies user account data for an account with an entity other than the wireless telephone service provider,
wherein the user that supplies the user account data for the account with the entity other than the wireless telephone service provider is authenticated, and
wherein the wireless portable device wireless connects to the Internet via an access point and a router of the wireless hotspot.

25. An advertising system as recited in claim 24, wherein the third party acts as an agent for the wireless service provider, wherein the third party provides an interface between the wireless hotspot and the wireless telephone service provider so that the wireless hotspot and the wireless telephone service provider do not directly interact.

26. An advertising system as recited in claim 24, wherein the third party comprises a Information Service Provider (ISP) with which the user has an account and wherein said transmitting means sends information about the location of and services offered by the wireless hotspot from the ISP.

27. An advertising system as recited in claim 24, further comprising:
monitoring means for monitoring traffic on a channel used to send out the advertising message; and
second timing means for waiting until the channel is clear before sending out a next advertising message.

28. A services determining system for determining services offered by a wireless hotspot, comprising:
querying means of a wireless portable device configured to query an access point of a wireless hotspot that is connected to an Internet about goods offered at a wireless hotspot location of the wireless hotspot;
timing means configured to time a reply to the query from the access point of the wireless hotspot; and
display means of the wireless portable device for providing a listing of the goods offered at the wireless hotspot location,
wherein the listing comprises a listing of at least one of the goods offered by the vendor, prices of the goods and descriptions of the goods,
wherein a third party service provider acts as an agent between a wireless telephone service provider and the wireless hotspot,
wherein the third party supplies hotspot services and advertises the hotspot services,
wherein the third party provider provides an interface such that the wireless telephone service provider and the wireless hotspot do not directly interact,
wherein a user supplies user account data for an account with an entity other than the wireless telephone service provider that provides wireless service to the wireless portable device,
wherein the third party authenticates the user that supplies the user account data for the account with the entity other than the wireless telephone service provider, and wherein the wireless portable device accesses the hotspot services supplied by the third party.

29. A services determining system as recited in claim 28, wherein the wireless hotspot further comprises a provider of wireless network services and wherein said providing means further comprises providing means for providing a listing of at least one of the wireless network services provided by the provider, access costs for access to the wireless network services, bandwidths available for access to the wireless network services, descriptions of the wireless network services and services determined to be of specific use for a wireless portable device.

30. An advertising system for advertising locations of and services offered by wireless hotspots, comprising:
   a requester that requests locations of and services offered by wireless hotspots, for wireless portable devices to wirelessly connect to a larger network, from a third party that acts as a go-between a wireless telephone service provider and a nearby hotspot, the third party supplying hotspot services and advertisings hotspot services, the third party providing authentication of users and processing and forwarding of billing information to wireless telephone service provider;
   a timer for use in awaiting a response from the third party;
   a receiver that receives information regarding locations of and services offered by wireless hotspots from the third party; and
   a provider that provides data to a user related to the received information,
   wherein the requestor supplies user account data for an account with an entity other than the wireless telephone service provider that provides wireless service to the requestor,
   wherein the third party authenticates the requestor that supplies the user account data for the account with the entity other than the wireless telephone service provider, and
   wherein the requestor accesses the hotspot services supplied by the third party.

31. An advertising system as recited in claim 30, wherein the third party acts as an agent for the wireless telephone service provider, wherein the third party provides an interface between the nearby wireless hotspot and the wireless telephone service provider so that the nearby wireless hotspot and the wireless telephone service provider do not directly interact.

32. An advertising system as recited in claim 30, wherein the third party comprises a Information Service Provider (ISP) with which the user has an account and wherein said receiver receives information about wireless hotspots closest to the user from the ISP based on a determination made by the wireless telephone service provider.

33. An advertising system as recited in claim 30, wherein said receiver receives information about wireless hotspots closest to the user based on global positioning information sent along with the request for locations of and services offered by said requester.

34. An advertising system as recited in claim 33, wherein said receiver receives at least one of directions to the wireless hotspots closest to the user and a map detailing routes to the wireless hotspots closest to the user.

35. An advertising system for advertising locations of and services offered by a wireless hotspot to potential users, comprising:
   a transmitter that sends out an advertising message, detailing a location of and services offered by a wireless hotspot, from a third party that acts as a go-between a wireless telephone service provider and the wireless hotspot, the third party supplying hotspot services and advertisings hotspot services, the third party maintaining user account information in a first database, the wireless telephone service provider maintaining user account information in a second database, the third party providing authentication of users and processing and forwarding of billing information to wireless telephone service provider;
   a timer for use in awaiting a response from the advertising message from a wireless portable device;
   a receiver that receives the response; and
   a provider that provides detailed information related to access of the wireless hotspot to the wireless portable device,
   wherein a user supplies user account data for an account with an entity other than the wireless telephone service provider that provides wireless service for the wireless portable device,
   wherein the third party authenticates the user that supplies the user account data for the account with the entity other than the wireless telephone service provider, and
   wherein the wireless portable device accesses the hotspot services supplied by the third party.

36. An advertising system as recited in claim 35, wherein the third party acts as an agent for the wireless service provider, wherein the third party provides an interface between the wireless hotspot and the wireless service provider so that the wireless hotspot and the wireless service provider do not directly interact.

37. An advertising system as recited in claim 35, wherein the third party comprises a Information Service Provider (ISP) with which the user has an account and wherein said transmitter sends information about the location of and services offered by the wireless hotspot from the ISP.

38. An advertising system as recited in claim 35, further comprising:
   a monitor that monitors traffic on a channel used to send out the advertising message; and
   a second timer for use in waiting until the channel is clear before sending out a next advertising message.

39. A services determining system for determining services offered by a wireless hotspot, comprising:
   a requester that queries an access point of a wireless hotspot by a wireless portable device about at least one of goods and services offered by the wireless hotspot, wherein a third party service provider supplies hotspot services and advertises hotspot services, wherein the requestor is wirelessly coupled to a wireless cellular network provider;
   a timer for use in awaiting a reply to the query from the access point of the wireless hotspot; and
   the third party providing a listing of goods offered at a wireless hotspot location of the wireless hotspot,
   wherein the listing comprises a listing of at least one of the following: goods offered by the vendor, prices of the goods and descriptions of the goods,
   wherein advertisements are transmitted by the wireless hotspot and received and displayed by the wireless portable device as a condition for allowing the wireless portable device to access wireless services of the wireless hotspot,
   wherein the requester accesses the hotspot services supplied by the third party service provider,
   wherein authentication on the wireless hotspot is provided by the third party service provider with which the user requester has an account, wherein the third party service provider acts as an agent between a wireless telephone service provider and the wireless hotspot, wherein the third party provider provides an interface such that the wireless telephone service provider and the wireless hotspot do not directly interact, wherein the third party provider provides processing and forwarding of billing information to a billing party, and wherein the vendor, the third party service provider and the wireless telephone service provider are different entities.

40. A services determining system as recited in claim 39, wherein the wireless hotspot comprises a provider of wireless network services and wherein said provider comprises a services provider for providing a listing of at least one of the wireless network services provided by the provider, access costs for access to the wireless network services, bandwidths available for access to the wireless network services, descriptions of the wireless network services and services determined to be of specific use for a wireless portable device.

* * * * *